(12) United States Patent  
Goodman et al.

(10) Patent No.: US 8,707,785 B2
(45) Date of Patent: Apr. 29, 2014

(54) ON-BOARD ULTRASONIC FREQUENCY SPECTRUM AND IMAGE GENERATION

(75) Inventors: Mark A. Goodman, Cortlandt, NY (US); William Bishop, Pleasantville, NY (US); Gary Mohr, Cortlandt Manor, NY (US)

(73) Assignee: U.E. Systems, Inc., Elmsford, NY (US)

( * ) Notice: Subject to any disclaimer, the term of this patent is extended or adjusted under 35 U.S.C. 154(b) by 383 days.

(21) Appl. No.: 13/088,195

(22) Filed: Apr. 15, 2011

(65) Prior Publication Data

US 2011/0252888 A1  Oct. 20, 2011

Related U.S. Application Data

(60) Provisional application No. 61/325,194, filed on Apr. 16, 2010.

(51) Int. Cl.
*G01N 29/00* (2006.01)

(52) U.S. Cl.
USPC .............................. 73/593; 367/153; 310/322

(58) Field of Classification Search
USPC .................. 73/593; 367/153, 154, 162, 176; 310/322; 381/352
See application file for complete search history.

(56) References Cited

U.S. PATENT DOCUMENTS

| | | | | |
|---|---|---|---|---|
| 3,964,014 | A * | 6/1976 | Tehon | 367/155 |
| 4,027,242 | A * | 5/1977 | Yamanaka | 455/76 |
| 4,034,332 | A * | 7/1977 | Alais | 367/153 |
| 4,629,834 | A * | 12/1986 | Waggoner et al. | 381/316 |
| 4,987,769 | A | 1/1991 | Peacock et al. | |
| 5,089,997 | A * | 2/1992 | Pecukonis | 367/135 |
| RE33,977 | E | 6/1992 | Goodman et al. | |
| 5,172,597 | A * | 12/1992 | Hedeen | 73/646 |
| 5,267,221 | A * | 11/1993 | Miller et al. | 367/140 |
| 5,432,755 | A * | 7/1995 | Komninos | 367/135 |
| 5,889,870 | A * | 3/1999 | Norris | 381/77 |
| 6,078,874 | A * | 6/2000 | Piety et al. | 702/122 |
| 6,122,966 | A | 9/2000 | Goodman et al. | |
| 6,216,539 | B1 | 4/2001 | Johnson et al. | |
| 6,247,353 | B1* | 6/2001 | Battenberg et al. | 73/40.5 A |
| 6,339,961 | B1 | 1/2002 | Goodman et al. | |
| 6,707,762 | B1 | 3/2004 | Goodman et al. | |
| 6,804,992 | B2 | 10/2004 | Goodman et al. | |
| 6,996,030 | B2* | 2/2006 | Goodman et al. | 367/176 |
| 7,373,143 | B2* | 5/2008 | Dygert | 455/418 |
| 7,914,468 | B2* | 3/2011 | Shalon et al. | 600/590 |
| 2001/0023795 | A1 | 9/2001 | Sekine et al. | |
| 2004/0090867 | A1* | 5/2004 | Goodman et al. | 367/135 |
| 2004/0250623 | A1 | 12/2004 | Walker et al. | |
| 2006/0061770 | A1 | 3/2006 | Erskine | |
| 2006/0209632 | A1* | 9/2006 | Goodman et al. | 367/13 |
| 2007/0087756 | A1* | 4/2007 | Hoffberg | 455/450 |

(Continued)

*Primary Examiner* — Peter Macchiarolo
*Assistant Examiner* — Samir M. Shah
(74) *Attorney, Agent, or Firm* — Leason Ellis LLP.

(57) ABSTRACT

A portable apparatus for determining testing the condition of a machine or device using ultrasonic signals with an array of ultrasonic sensors for receiving an ultrasonic signal transmitted from the machine or device. The apparatus possesses a heterodyne circuit coupled to receive the output signals from the ultrasonic sensors and convert the output signals to a heterodyned audio signal to be analyzed via a digital spectrum analyzer integral to the portable apparatus. The digital spectrum analyzer performs real-time fast fourier transformations on the heterodyned audio signal. After analyzing the signals, the hand held device uses a variety of audiovisual cues to direct a user to portions of the machine in need of repair or monitoring.

24 Claims, 8 Drawing Sheets

(56) References Cited

U.S. PATENT DOCUMENTS

| | | | |
|---|---|---|---|
| 2007/0204695 A1* | 9/2007 | Gross et al. | 73/585 |
| 2009/0215502 A1 | 8/2009 | Griffin, Jr. | |
| 2010/0071998 A1 | 3/2010 | Cerveny | |
| 2010/0317420 A1* | 12/2010 | Hoffberg | 463/1 |
| 2011/0004513 A1* | 1/2011 | Hoffberg | 705/14.1 |
| 2011/0125063 A1* | 5/2011 | Shalon et al. | 600/590 |
| 2012/0078534 A1* | 3/2012 | Selker et al. | 702/33 |

\* cited by examiner

ON-BOARD ULTRASONIC FREQUENCY SPECTRUM AND IMAGE GENERATION

CROSS-REFERENCE TO RELATED APPLICATION

This application is related to and claims the benefit of U.S. Provisional Patent Application Ser. No. 61/325,194 filed Apr. 16, 2010 and entitled ON-BOARD ULTRASONIC FREQUENCY SPECTRUM AND IMAGE GENERATION, the contents of which are incorporated herein by reference in their entirety. This application is also related to U.S. patent application Ser. No. 13/088,212 entitled AN ULTRASONICALLY CONTROLLABLE GREASE DISPENSING TOOL filed concurrently herewith.

BACKGROUND OF THE INVENTION a. Field of the Invention

The invention relates generally to ultrasonic detectors and, more particularly, to portable ultrasonic detectors used to detect the condition of motor bearings and/or arcing in electrical cabinets at widely separated locations.

b. Description of the Related Art

Ultrasonic sensors have been used to detect ultrasonic energy generated by friction within mechanical devices, such as that created by worn bearings, as disclosed in U.S. Pat. No. Re. 33,977 to Goodman, et al., the contents of which are hereby incorporated herein by reference in their entirety. The greater the amount of friction, the greater is the intensity of the generated ultrasonic energy. Applying a lubricant to the device reduces friction and consequently the intensity of the generated ultrasound drops. Measuring ultrasonic energy thus provides a way to determine when lubrication has reached the friction generating surfaces. Additionally, faulty devices, such as bearings, generate a higher level of ultrasonic energy than do good bearings and thus, this condition can also be detected.

In the past decisions have been made on when to lubricate bearings based on the amount of time that has passed since the last application of lubricant and the specific amount of lubricant added at that time. Typically this information was compared to manufacturer's recommendations. However, a major reason for bearing failure is improper lubrication, not just a failure to lubricate. In particular, over lubrication can be a problem. It is known in the art to combine a lubrication tool with an ultrasonic detector to help control the application of lubricant to bearings. Such devices are disclosed in U.S. Pat. No. 6,122,966 and No. 6,339,961 of Goodman et al., the contents of which are incorporated herein by reference in their entirety.

Arcing in electrical equipment, e.g., from transformers in electrical cabinets, also produces ultrasonic signals that can be detected. Examples of this use can be found in U.S. Published Patent Application US2006/0209632-A of Goodman, the details of which are hereby incorporated herein by reference in their entirety. Both motors and electrical cabinets used in large facilities may be positioned at widely separated locations.

Since acoustic energy created by faulty bearings and discharging electrical components is both in the audible and ultrasonic frequency ranges, generally in the range of 40 kHz, in noisy audible industrial environments, the ultrasonic component is easily detected and located. Thus, means are typically provided for heterodyning, or demodulating, the detected signal into the audio range, and various schemes are available for doing this.

When using ultrasonic energy to detect leaks, worn bearings, electrical arcing or other malfunctions, it is useful to have a portable ultrasonic sensor which indicates the presence and intensity of ultrasonic energy both visually and audibly. U.S. Pat. No. Re. 33,977 to Goodman et al. discloses an ultrasonic sensor that displays the intensity of the detected signal on an output meter operable in either linear or logarithmic mode, and also provides for audio output through headphones. U.S. Pat. No. 4,987,769 to Peacock et al. discloses an ultrasonic detector that displays the amplitude of the detected ultrasonic signal on a ten-stage logarithmic LED display. However, the detector disclosed in Peacock does not process the detected signal to produce an audible response, nor does it provide for signal attenuation after the initial pre-amplification stage.

A portable device which has been used in the past to detect ultrasonic energy is the UE 10,000 made by U.E. Systems of Elmsford, N.Y. This device is covered by U.S. Pat. No. 6,707,762, No. 6,804,992 and No. 6,996,030 to Goodman et al, which are incorporated herein by reference in their entirety. The UE 10,000 detects ultrasonic signals from worn bearings and converts the signals to the audio range. These signals can then be heard by an operator thought headphones as a way of detecting malfunctions. The audio signal can be saved and later downloaded to an external spectrum analyzer in order to make more precise determinations of the status of the bearings.

After extended use of the detection equipment, operators often tend to begin to use their ears as a guide to the condition of the motor bearings, as opposed to the amplitude readings on the LCD display of the device. However, it is extremely difficult for a person to discern with their ears the differences between inputs that are representative of bearings just beginning to become worn and those which are more seriously worn. The use of the human ear is a highly unreliable way in which to predict faults. By delivering the signal to an external spectrum analyzer, this can be overcome. The difficulty is that the motors with bearings under test can be spread out over large distances. By the time all of the motors have been surveyed, the portable detector has been returned to a maintenance facility and the stored heterodyned or audio signals are downloaded to a spectrum analyzer, bearings which are marginal may fail. Complete failure of the bearings can leave a motor inoperable for a period of time. In some instances, it is very detrimental to have a motor out of service for even a small amount of time, e.g., a cooling pump.

In addition to ultrasonic detection apparatus, the UE, 15000 also includes a camera with which images of the machine under test can be recorded. This is useful in locating and identifying a particular motor which has a bearing problem.

It would be advantageous if portable ultrasonic detectors had the on-board capability to perform spectrum analysis on received signals. This would eliminate the time delay between a reading and confirmation of the detection of an impending bearing fault.

Fault prediction can be based not only on the absolute value of a reading, but also on a comparison with a prior reading. For example, a good bearing may make an unusually large ultrasonic signal, but not be in a failure mode. If a consistent signal is detected over a long period of time there may be no need to take corrective action. However, if the level is increasing over time, it may be prudent to replace the bearing at the next convenient time. Thus, it would further be beneficial if the portable ultrasonic detector were to have an on-board recording and storage device that can be used to compare the current sound from the item under test, e.g., a bearing, with sounds recorded previously.

SUMMARY OF THE INVENTION

The present invention is directed to improved apparatus and methods for detecting faulty bearings, arcing transformers and the like at widely separated locations through the use of portable hand-held ultrasonic detectors.

Prior art portable hand-held ultrasonic detectors are equipped with analog detector circuits for detecting ultrasonic signals generated by faulty bearings, discharging electrical components or the like. These ultrasonic signals are amplified and demodulated to the audio range where an operator may listen to them on headphones connected by cable to the portable unit. According to an embodiment of the invention a digital spectrum analyzer is located on board the portable hand-held ultrasonic detector. This spectrum analyzer performs Fast Fourier Transforms of the signal. Thus, the operator can not only listen to the audio signal derived from the ultrasonic signal and observe the sound level, but the operator can observe the spectrum of the signal on a screen located on the portable device. This provides the operator with the ability to make very accurate judgments in real time about the status of the bearing or transformer without having to rely simply on his hearing.

In another embodiment of the present invention, a Bluetooth circuit converts the audio signal into short range wireless signals that can be picked up by a head set worn by the operator. This eliminates the need for a cable connecting the headphones to the portable unit.

In addition, one embodiment of the Bluetooth circuit may incorporate voice playback and the headset may include a microphone. Thus, during a test an operator may make verbal comments, which pass from the microphone back through the Bluetooth connection to a data recorder in the hand-held unit. The data recorder may record the audio signal created by the worn bearings or arcing, along with the operator's comments. These comments may include the operator's impression of the sound, information about the environment in which the device is operating (e.g., heavy rain) or some suggestion about compensating for the faulty condition.

In a further embodiment the portable device may have a Wi-Fi circuit, so that longer range signal transmission can be effected. This may be used to rebroadcast the operator's comments to a local maintenance facility. In such a case the comments could be a request for a repair team to immediately replace faulty equipment.

It is a further improvement to use the Bluetooth and Wi-Fi connections to transmit recorded data to a base station or computer network. Additionally, the Bluetooth and Wi-Fi connections can be used to connect and exchange data with any wirelessly equipped data monitoring device.

A further improvement that can be provided by the present invention is to provide storage on the portable detector for the recording of prior heterodyned audio signals and/or spectrums. As a result, the diagnoses of the fault condition can be even more precise because the sound and/or spectrum at one or more past times can be compared in real time to the current sound and/or spectrum on the portable device at the location of the test motor or electrical cabinet. Using the Bluetooth and Wi-Fi connections, a central maintenance operation can be immediately notified of an imminent fault detected in this manner.

As in prior systems, the present invention can be provided with a camera that allows a picture to be taken of the device under test. Unlike in the past, this picture can be made a part of a file for the device under test, which file is stored on the portable ultrasonic detector. The file would contain the sound level reading, a spectrum of the audio, the operator's comments on the test and a picture of the actual device. The file can also contain past readings and spectrums. Further, the picture can have the current reading as an overlay. Such precise identification of the test results can help to reduce liability for a facility maintenance company. In particular, if it can be shown that the device was operating properly at the last test, the maintenance company's liability for a failure subsequent to that test may be reduced.

Photos may also help with fault detection. By comparing the current image with a prior image, changes in the device under test can be noted. If one image is formed as a semi-transparent overlay on the other, differences are more easily determined.

In order to improve the quality of the pictures taken with the camera, it can be provided with an LED flash unit. Also, the detector can be provided with a laser pointer to aid in precise aiming of the camera. The laser pointer can also be part of a distance measurement device so that pictures can be taken from the same distance on different occasions without much difficulty.

Typically when testing is being provided in a large facility, the operator is directed to make the tests over a particular route. Because of the images stored on the portable ultrasonic detector, route guidance can be visual, i.e., the operator's route can be set by a series of photos of where the operator is to go for the next test point.

Images and spectrums may be viewed on an LCD display screen provided on the portable ultrasonic detector. The LCD display may be a touch screen so that controls for operating the system may also be provided on the screen in the form of a graphical user interface. Thus the equipment can be used in dirty environments and the use of a touch screen can prevent fine dirt particles from damaging the controls.

Further, in addition to the display screen on the portable ultrasonic detector, the images can be transmitted via a wireless connection to a mobile device, such as an I-Phone or Blackberry. Thus the image would be available at a remote and mobile device. Such a device could be carried by a supervisor so that if an operator had a question about an image, it could be sent to the supervisor in real time for analysis of the status of the machine.

The storage of heterodyned ultrasound, images and spectrums can be on removable media cards such as an SD or other removable media type. This allows information to be easily uploaded to a central computer or downloaded to the portable hand-held ultrasonic detector.

A still further embodiment includes an infrared temperature sensor. Frequently failing bearings or discharging electrical components have a higher temperature than devices operating normally. Thus, the temperature can be recorded to assist in failure prediction. The temperature measurement, like the other measurements can be stored in the file for the device under test and can be compared to prior measurements as a way of diagnosing failures. This infrared temperature sensor can be a spot pyrometer or an infrared image sensor.

Additional features, advantages, and embodiments of the invention may be set forth or apparent from consideration of the following detailed description, drawings, and claims. It is to be understood that both the foregoing summary of the invention and the following detailed description are exemplary and intended to provide further explanation without limiting the scope of the invention as claimed.

BRIEF DESCRIPTION OF THE DRAWINGS

The foregoing and following descriptions of the invention will be better understood by reference to the accompanying drawings, in which.

DETAILED DESCRIPTION OF THE PREFERRED EMBODIMENT

Figure 1:
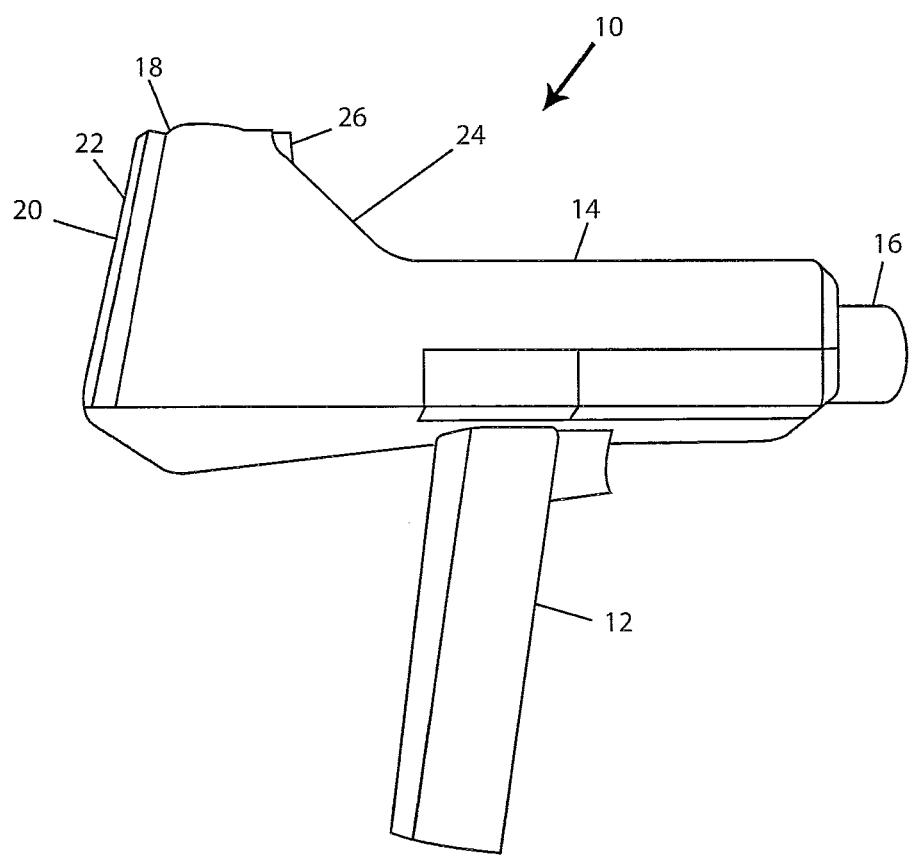
FIG. 1 is a side elevation view of the portable hand-held ultrasonic detector according to the present invention.

Referring now to the drawings wherein like references numerals designate corresponding parts throughout the several views. FIG. 1 is a side view of the portable hand-held ultrasonic detector 10 of the present invention. It includes a handle 12 with a main body 14 attached at its upper end. The main body houses the circuits for the detector. At the front of the main body there is a housing 16 in which one or more ultrasonic detector transducers are located. At the rear of the main body 14 there is an enlarged portion 18 in which a touch screen display 20 is located. In addition an SD memory slot 22 is located in the enlarged portion and can receive one or more SD memory cards. The SD memory is used to store current and historical data on audio signals, their spectra and photographs.

Figure 2:
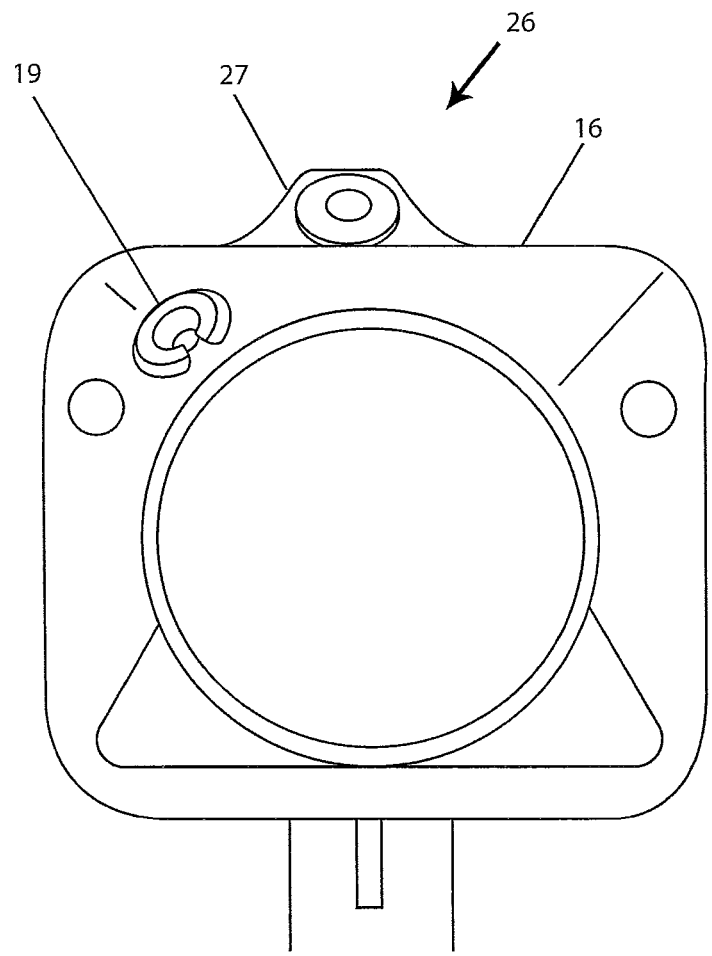
FIG. 2 is an enlarged front view of the portable hand-held ultrasonic detector according to the present invention showing the detector and temperature sensor.

As shown in FIG. 2 the front of the housing 16 has a wire mesh cover 17 to protect the transducers. Located in the front surface of the main body 14 is an infrared sensor 19. This sensor can be used to measure the temperature of the motor or electrical cabinet under test. A rise in temperature can be a sign of worn bearings or discharging electrical components.

Figure 3:
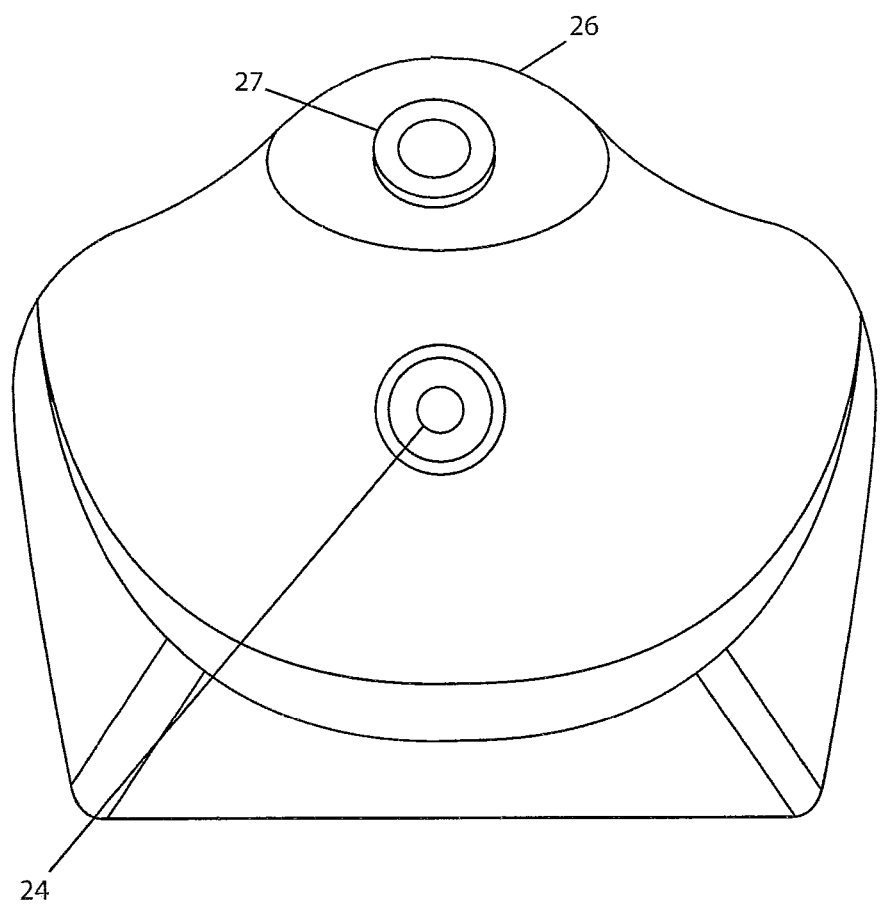
FIG. 3 is an enlarged front view of the section of the portable hand-held ultrasonic detector showing the camera, flash and laser pointer.

FIG. 3 shows an enlarged view of the sloped front surface of the enlarged portion 18. It includes a laser pointer 24. The laser beam from this pointer can be used to aim the infrared temperature detector. It can also be used to aim a camera 26 with a flash 27 that are located in the enlarged portion and project from its front surface. Further, in one embodiment the laser pointer 24 can be used as a distance measuring device, e.g., so that the ultrasonic or temperature measurements are taken from the same distance from the motor or electrical cabinet on different occasions.

Figure 4:
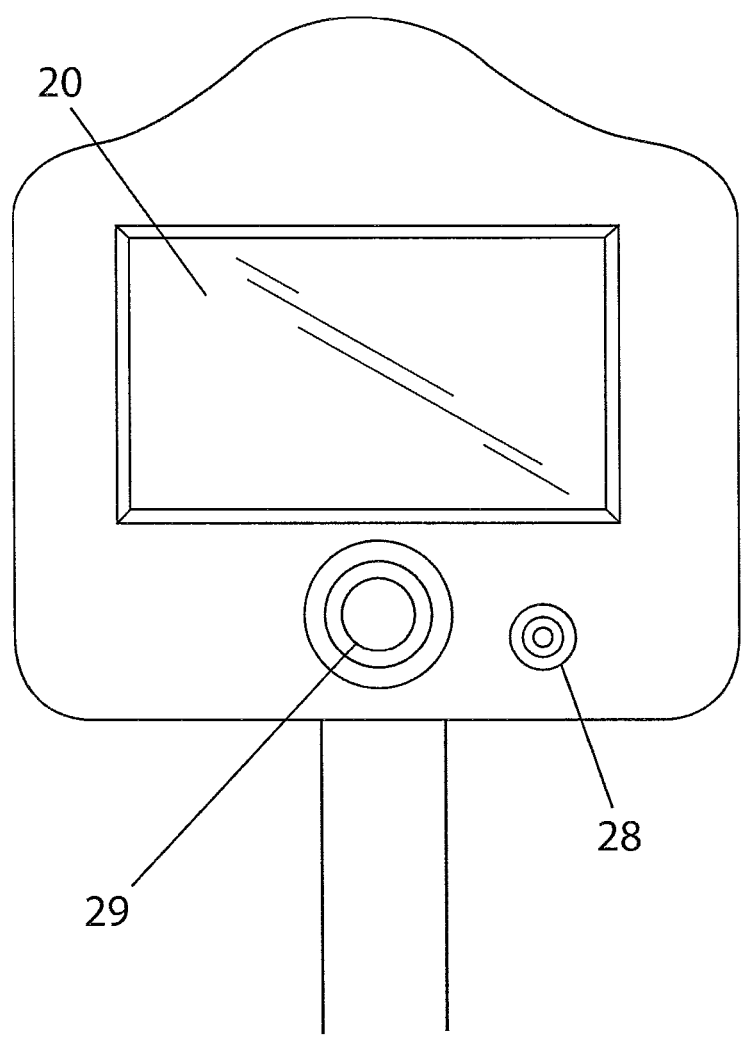
FIG. 4 is a rear elevation view of the portable hand-held ultrasonic detector according to the present invention showing the touch screen display.

FIG. 4 illustrates the touch screen display 20 on the rear surface of the enlarged portion 18. On this screen there can be displayed the audio signal and/or a spectrum of a portion of that signal. Also, the db measurements can be displayed along with other sensed information, e.g. temperature. Further, pictures taken by camera 26 can be displayed with the other information appearing as an overlay.

The screen display 20 can also have operator controls displayed on it as part of a graphical user interface. An image of a control can be formed on the screen by the CPU. The operator can touch the screen adjacent one of the control images and the CPU can interpret the touch as a direction to change the control, e.g., the db or sensitivity or frequency ranges. In addition to the touch screen, there is a special function button 29 on the rear surface of the enlarged portion 18.

On the rear surface of the enlarged section there is also a headphone jack 28 which can receive wired head phones. The operator can use these headphones to listen to the heterodyned audio signal and make an initial determination of the condition of the bearings of a motor, the electrical discharge of a transformer in an electrical cabinet or an compressed gas leak. As will be noted, in addition to wired headphones, the detector can also allow the operator to listen to the audio signal wirelessly through a Bluetooth circuit.

Figure 5:
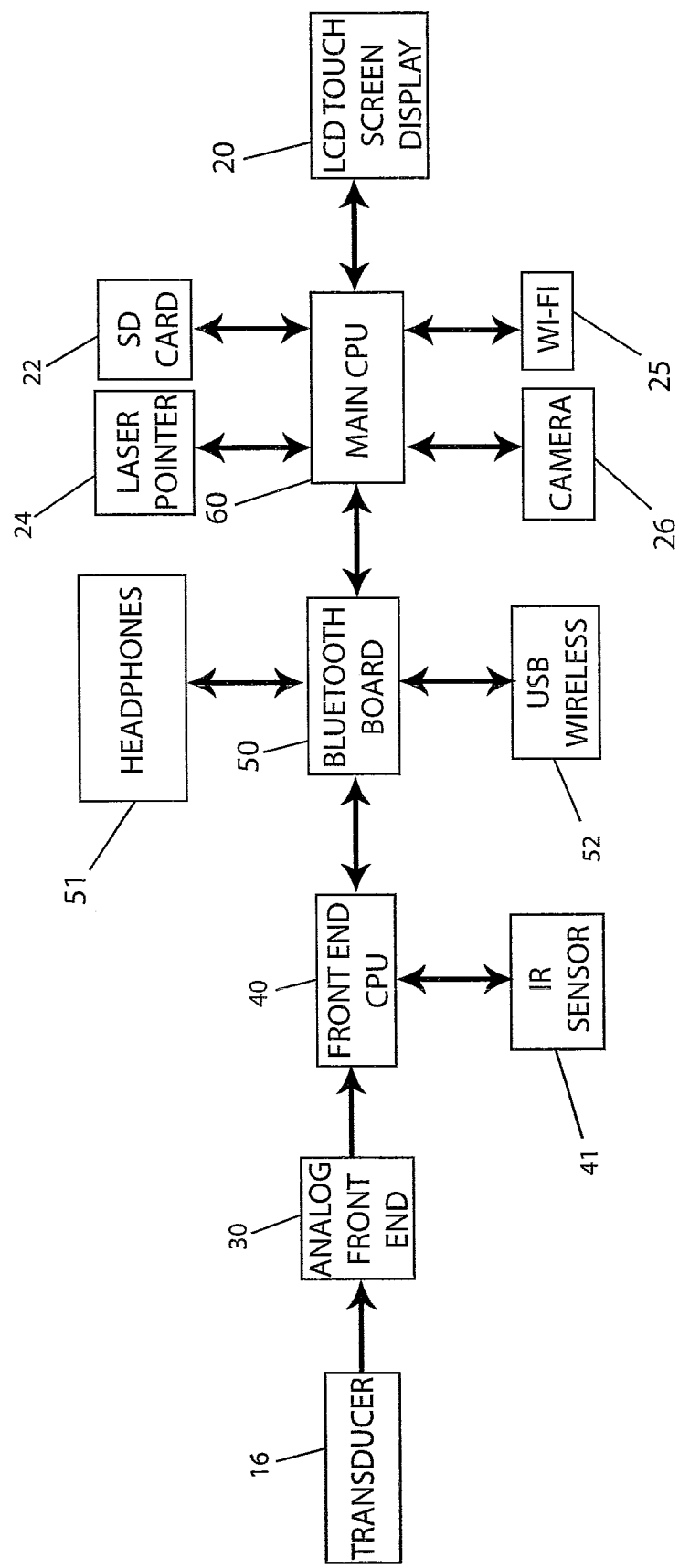
FIG. 5 is a block diagram of the circuits of the portable hand-held ultrasonic detector according to the present invention.

A block diagram of the circuits in the main body 14 that control the detector is shown in FIG. 5. Physically an analog front end circuit 30, a front end CPU circuit 40, a Bluetooth circuit 50 and a main CPU circuit 60 are stacked together and connected by a bus which carries the primary signals, such as the audio signal WAV.

The ultrasonic signal from bearings or discharging electrical components is picked up by transducers 15 and fed to the analog from end 30. In the front end 30 the signal is buffered, amplified and converted to an audio signal WAV by heterodyne circuits. The front end CPU 40 operates as a sub-processor that carriers out detailed instructions from main CPU 60 (e.g., generating voltages to set the sensitivity and frequency in response to operator selection at the touch screen as interpreted by the main CPU) and otherwise passes the WAV signal to the Bluetooth circuit 50. The front end CPU also receives sensor signals, e.g., battery life signals and temperature signals from the IR temperature sensor 41, and sends them to the main CPU for analysis. The Bluetooth circuit 50 prepares the WAV signal for transmission to wireless headphones 51 and also passes it through to the main CPU. Further, the Bluetooth circuit provides a wireless USB port 52 for wide range communication of the WAV signal.

The main CPU 60 controls all of the functions of the detector. It converts the WAY signal to a spectrum by performing a Fast Fourier transform on a portion of it. The outputs of the main CPU are displayed on touch screen 20. Further, it controls the laser pointer 24, stores data in and retrieves data from SD memory 22. The camera and flash 26 are also controlled by the main CPU and receive images from the camera for display on screen 20 and storage in SD memory 22. A Wi-Fi module 25 can also be operated by the main CPU 60.

Figure 6:
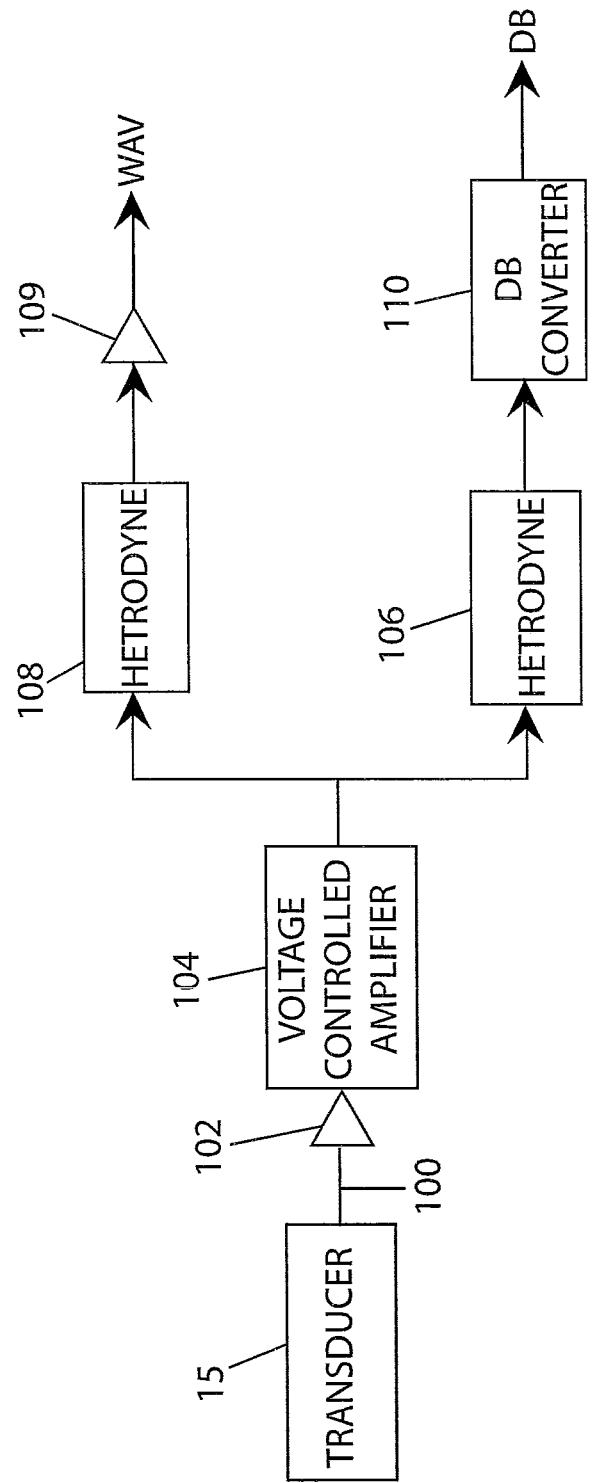
FIG. 6 is a block diagram of the analog front end circuit of FIG. 5.

FIG. 6 shows the analog front end of the portable hand ultrasonic detector of the present invention. This circuit is similar to that in the U.E. Systems UE10,000 model detector as disclosed in U.S. Pat. No. 6,707,762. The transducer 15 is connected at the circuit input 100.

The ultrasonic signal from the transducer is buffered in amplifier 102 and passed through voltage controlled amplifier 104. The setting for amplifier 104 is controlled by the operator using the touch screen. The touch screen signals are converted into digital signals by the main CPU and its output sets the gain of this amplifier.

As in the UE 10,000, the ultrasonic signal is fed to first heterodyne circuit 106 and separately to second heterodyne circuit 108. The heterodyne circuits convert the ultrasonic frequency signal to an audio signal. The audio output of heterodyne circuit 106 is applied to the DB converter circuit 110, which generates a d.c. signal that is equivalent to the amplitude of the audio signal in db. This is applied to the main CPU, which displays the information on the screen 20.

The second heterodyne circuit 108 produces the WAV signal, which after amplification by circuit 109 is applied to the main CPU for sampling and is subject to spectrum analysis.

Figure 7:
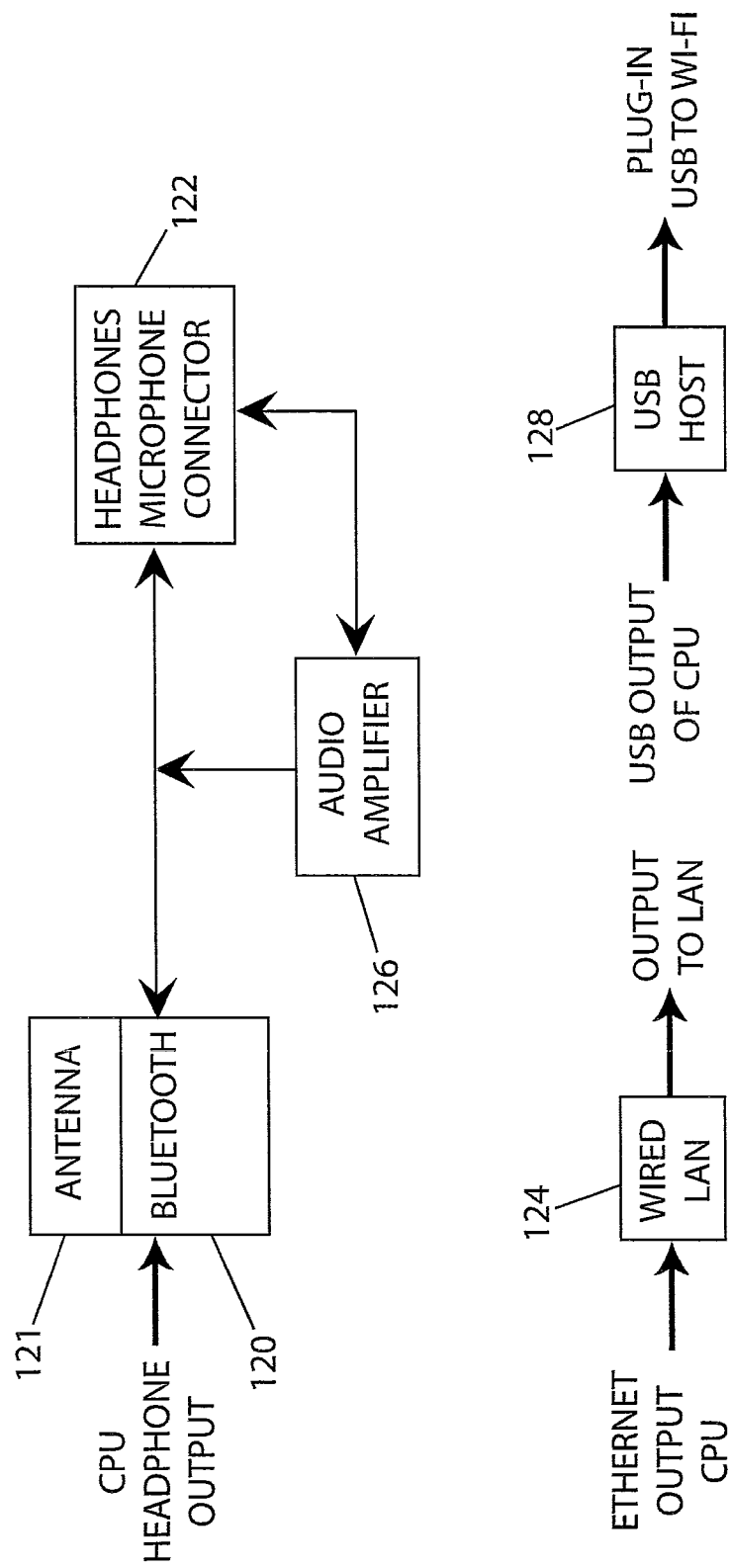
FIG. 7 is a block diagram of the head phone Bluetooth, wired LAN and USB Host circuits of FIG. 5.

The Bluetooth circuit of FIG. 7 is connected to the headphone connector of the main CPU. The signals are then directed to the Bluetooth transmitting circuit 120, which has an antenna 121. Thus, the signal can be broadcast a short distance using Bluetooth protocol from the hand-held unit to a Bluetooth earpiece or a Bluetooth speaker and microphone headset. This circuit also includes a wired LAN circuit 124 which provides an Ethernet connection to the main CPU. The LAN circuit 124 provides an output to a local area network, and perhaps to the Internet. Further, the circuit provides an auxiliary audio amplifier 126. If longer range connections are desired, a USB Host is available as a plug-in Wi-Fi connection.

Figure 8:
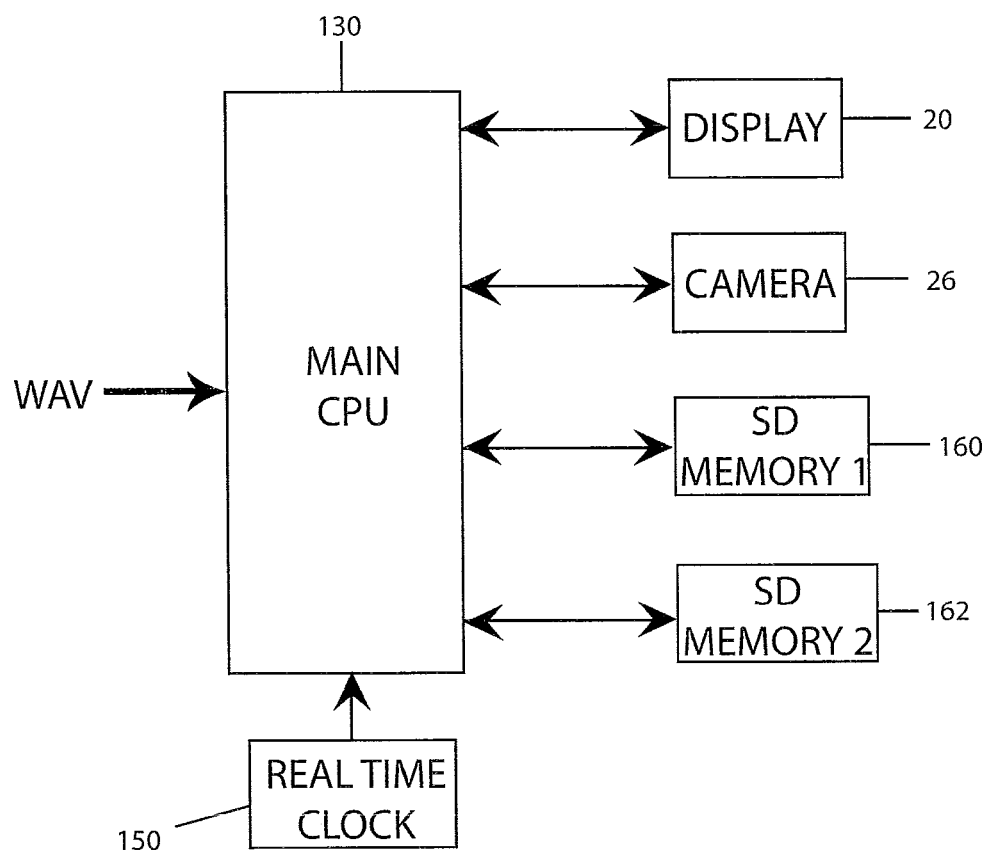
FIG. 8 is a block diagram of the Main CPU of FIG. 5.

FIG. 8 shows the main CPU board. In addition to the main CPU 130 which receives the WAV signal, there are connections to the display 20, a real time clock 150 and two SD card slots 160, 162, which together form slot 22 of FIG. 1. One of the slots receives a high density SD card which provides system memory where WAV files can be stored along with photo images and spectrum signals. The main CPU reconstructs the sampled WAV file The main CPU controls all of the functions of the portable hand-held ultrasonic detector. In addition, it performs complex analysis of the WAV signal. For example, it can perform Fast Fourier Transforms on the WAV signal and can display the results on the screen.

In operation the portable hand-held ultrasonic detector 10 may be carried about a large facility by an operator checking to be sure that the bearings of motors, coils of transformers and devices of the like that emit ultrasonic energy, are operating correctly and are not likely to fail in the near future. Typically the operator will follow a set route about the facility. This route may be included as a text file on the detector itself. However, it is a feature of the present invention that the route can be indicated as a series of photographs which can visually guide the operator from one testing station to another. The original route can be constructed using the camera 26 built into the detector. Thus, at a later date when the present invention is being used, a visual route can be determined by the inspector from present and prior images of the machines and the paths connecting machines.

When the detector is turned on at the location of equipment generating ultrasonic signals, these signals are detected by transducers in the equipment. These ultrasonic signals are amplified and heterodyned to the audio range by the analog front end 30 so the operator may listen to them on headphones connected by cable to the portable unit. In one embodiment of the present invention, the Bluetooth circuit 50 converts the audio signal (WAV) into short range wireless signals that can be picked up by a wireless headset worn by the operator. This eliminates the need for a cable connecting the headphones to the portable unit.

In addition, one embodiment the Bluetooth circuit may incorporate voice back and the headset may include a microphone. Thus, during a test an operator may make verbal comments, which pass from the microphone back through the Bluetooth connection to a data recorder in the hand-held unit 10. The data recorder may record the heterodyned audio signal created by the worn bearings or arcing, along with the operator's comments. These comments may include the operator's impression of the sound, information about the environment in which the device is operating (e.g., heavy rain) or some suggestion about compensating for the faulty condition.

In a further embodiment the portable device may have a Wi-Fi circuit 25, so that longer range signal transmission can be effected. This may be used to rebroadcast the operator's comments to a local maintenance facility. In such a case the comments could be a request for a repair team to immediately replace faulty equipment.

In a still further embodiment of the invention the CPU of the detector can perform a digital spectrum analysis of the audio signal on board the portable hand-held ultrasonic detector 10. This spectrum analysis is created by the CPU performing Fast Fourier Transforms of the signal. Thus, the operator can not only listen to the audio signal derived from the ultrasonic signal and observe the sound level, but the operator can observe the spectrum of the signal on the screen 20 located on the portable device. This provides the operator with the ability to make very accurate judgments in real time about the status of the bearing or transformer without having to rely simply on his hearing.

Storage on the portable detector for the recording of prior audio signals and/or spectrums is provided by the removable SD cards 22. This allows information to be easily uploaded to a central computer or downloaded to the portable hand-held ultrasonic detector. As a result of this storage capacity, the diagnosis of the fault condition can be even more precise because the sound and/or spectrum at one or more past times can be compared in real time to the current sound and/or spectrum on the portable device at the location of the test motor or electrical cabinet. Using the Bluetooth and Wi-Fi connections, a central maintenance operation can be immediately notified of an imminent fault detected in this manner.

The camera 26 allows a picture to be taken of the device under test. Unlike in the past, this picture can be made a part of a file of the device under test stored on the portable ultrasonic detector. This file can contain the sound level reading, a spectrum of the audio signal, the operator's comments on the test and a picture of the actual device. The file can also contain past readings and spectrums. The picture can have the current reading as an overlay. Such precise identification of the test results can help to reduce liability for the company charged with maintenance of the facility. In particular, if it can be shown that the device was operating properly at the last test, the maintenance company's liability for a failure subsequent to that test may be reduced.

In order to improve the quality of the pictures taken with the camera 26, it can be provided with an LED flash unit 27. Also, the detector can be provided with a laser pointer to give precise aiming of the camera (FIG. 3). Further, the laser pointer 24 can be part of a distance measurement device so that pictures can be taken from the same distance on different occasions without much difficulty.

The photos taken with camera 26 may also help with fault detection. By comparing the current image with a prior image, changes in the device under test can be noted. If one image is formed as a semitransparent overlay on the other, differences are more easily determined. Providing images to a user allows for a baseline image to be taken regarding the original condition of the machine. It is envisioned that these images can be combined in a composite overlay so as to produce visual time-lapsed changes of the machine under analysis over time. This provides visual information demonstrating the trending condition of both the machine and the diagnostic tests over time. Thus, for example, a discoloration of the bearing housing that grows over time may be an indication of excess heat.

A view of images and spectrums may be provided by the LCD screen 20 located on the portable ultrasonic detector. The LCD screen may be a touch screen so that controls for operating the system may also be provided on the screen in the form of a graphical user interface. The equipment can thus be used in dirty environments, since the use of a touch screen can prevent fine dirt particles from damaging the controls.

A still further embodiment of the invention allows the Wi-Fi and Bluetooth circuits to provide bi-directional transmission of data to a base computer or computer network. This allows the data being transmitted to the LCD screen to also be mirrored onto a network drive or to a remote access terminal for external review. Additionally, the user of the hand-held device can also send specific information and data sets to additional users for confirmation or alternative opinions regarding the proper procedure. By incorporating wireless communication, the user is also able to access a remotely hosted database or server in order to compare data. The comparison of data can be done in real-time and can allow present readings taken from the hand-held device to be compared with prior readings from the same or similar device. Alternatively, after a data logging event has taken place, the hand-held device can be used to compare prior data sets to visualize changes or alterations over time. Furthermore, it is envisioned that the hand-held device has the ability to use prior acquired data to compare recorded data or live data to analytical models.

The Wi-Fi and Bluetooth functions also provide the invention with the ability to connect with any wirelessly equipped stand-alone information recording device. By way of a non-limiting example, the present invention can share data and control the functions of an optical or strobe tachometer, IR camera, vibration analyzer or any other device configured for environmental sensing. As such, data gathered by the diagnostic tool prior to or during a maintenance operation can be stored or accessed via a network communication from any network accessible device. Thus, the information from these various external sources can be combined into a single source of information at the detector.

It is envisioned that a user of the invention will have access to a storage facility with a database via a network. Through that access, the user can then transmit continuous data to the network for remote analysis or storage. It is further envisioned that the database will have selectable data entries that will be available to the user for uploading or collaborating on data captured by the present invention.

Another feature of the present invention is the capability to locally transmit data via an ad-hoc network to PDAs, smart phones, netbooks, tablets, or other data display and processing platforms. It is also envisioned that the data generated by the claimed invention can be accessed or remotely viewed via mobile platforms.

Another feature of the present invention is the presentation of instructions, demonstrations, procedures and tutorials to a user, depending on the particular task to be performed. The invention is capable of selecting the appropriate instructional materials from either the internal storage device or a network accessible database and presenting them to a user of the invention on a context sensitive basis. By way of non-limiting example, a user of the present invention could desire to capture data related to the audio spectrum. By and through the elements stated, the invention would provide instructions, displayed on the device itself, for the procedures and safety requirements necessary to undertake that specific task. Furthermore, the instruction feature of the present invention is capable of recording data and screen images to provide for new instructional information or examples for future users. Thus, it is envisioned that the ultrasonic hand-held device can function as a conduit for directing network sourced instructions to the diagnostic tool.

It is envisioned that the data captured and transferred to a local or remote storage device can be, without limiting the disclosure thereof, audio data, temperature data, spectrographic data, visual information, video data, directional and vibration data or any configured mechanism to capture data on physical conditions and phenomena. By way of non-limiting example, either local or networked data can be provided to the hand-held device and be used to continuously adjust user feedback systems for devices that have variable parameters, such as changing temperature gradients, variable speeds, etc. For example the tempo or cadence of an alarm can be controlled in order to correspond to the variable conditions within a device to be analyzed.

The present invention is further capable of capturing data with respect to particular physical phenomena and interpreting that data with respect to the overall goal of the data capture and analysis. By way of non-limiting example, if the present invention determines a change in the rpm of a variable speed drive, the audio alarms can be altered to reflect the changing conditions of the drive.

The present invention is capable of combining several different inputs and using those inputs to determine the overall quality or condition of a device or structure. By way of non-limiting example, the present invention is capable of combining environmental data, such as temperature or acoustic resonance patterns, and determining from those data points whether or not a device is functioning properly. As an example, the hand-held ultrasonic detector can be used for evaluating steam traps. The escape of steam from or through such a trap will generate ultrasonic signals that can be detected and measured. Further, the infrared sensor or some other temperature sensor on the device can measure the temperature at the steam trap. Thus, the operator can tell if the steam trap is good or bad based on temperature and sound level or pattern.

A further embodiment of the present invention includes the ability to connect to a maintenance or diagnostic tool via wireless communications means. The diagnostic tool is configured to be controllable by the hand-held device as well as configured to transmit data gathered during usage to the hand-held device via wireless means. It is envisioned that the diagnostic tool also includes the means to effectuate repair or maintenance on a device or structure. For example, it is envisioned that the physical manipulator could be a dispensing tool for water, lubricant, or grease, with the capability to monitor both the level of material dispensed and the amount of material in existence in the environment.

It is envisioned that previously stored data concerning the physical environment is available to the ultrasonic hand-held device. The device would be capable of providing structural and historical information, and can have the capacity to take measurements of the environment. A still further embodiment includes infrared temperature sensor 41. Frequently failing bearings or discharging electrical components have a higher temperature than devices operating normally. Thus, the temperature can be recorded to assist in failure prediction. The temperature measurement, like the other measurements can be stored in the file for the device under test and can be compared to prior measurements as a way of diagnosing failures.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A portable apparatus for testing the condition of a machine or device using ultrasonic signals, comprising:
   an array of ultrasonic sensors for receiving said ultrasonic signals transmitted from the machine or device;
   a heterodyne circuit coupled to receive output signals from the ultrasonic sensors and convert the output signals to a heterodyned audio signal; and
   a digital spectrum analyzer integral to the portable apparatus configured to perform real-time fast fourier transformations and time series on the heterodyned audio signal.

2. The apparatus of claim 1, further including a central processor and wherein the ultrasonic sensors, heterodyne circuit and digital spectrum analyzer functions are controlled by said central processor.

3. The apparatus of claim 2, wherein the heterodyne circuit forms an analog front end and outputs a digital signal to said central processor.

4. The apparatus of claim 2, wherein the digital spectrum analyzer is a software module configured to be executed in said central processor.

5. The apparatus of claim 2, further including a display device and wherein the central processor is further configured to be connected to said display device.

6. The apparatus of claim 5, wherein the display device is a touch screen display capable of conveying user input to the central processor.

7. The apparatus of claim 5 further including a storage device configured to store audio and/or visual data, wherein the display device is capable of simultaneously displaying data from the digital spectrum analyzer and stored visual data in the form of a reference image.

8. The apparatus of claim 5, further including a storage device configured to store audio and/or visual data, wherein the storage device has stored there in a sequence of images of machines corresponding to a specific route according to which the machines are to be tested, and said processor causes the display to display said images in sequence according to the route.

9. The apparatus of claim 8, wherein each route is a unique composite image file.

10. The apparatus of claim 5, further including a storage device configured to store audio and/or visual data, wherein the storage device has stored there in a sequence of images of procedural steps needed to properly test the condition of the device or machine, and said processor causes the display to display the steps according to the procedure.

11. The apparatus of claim 10, wherein each series of procedural steps is a unique composite image file.

12. The apparatus of claim 2, further including a storage device, a plurality of environmental sensors and a plurality of bi-directional data transfer devices for sending information to and from said sensors, wherein the processor can analyze and record in the storage device data received from said environmental sensors.

13. The apparatus of claim 12, wherein stored data can be transferred between the apparatus and a computer network or a computer base station using RF frequencies.

14. The apparatus of claim 2 further including a storage device, and wherein the processor is configured to compare real-time digital signal analysis with previously performed digital signal analysis stored in said storage device.

15. The apparatus of claim 1 further including a plurality of environmental sensors and a plurality of bi-directional data transfer devices for sending information to and from said sensors.

16. The apparatus of claim 15, wherein the plurality of said bi-directional data transfer devices can be wired or wireless devices.

17. The apparatus of claim 16, wherein the plurality of bi-directional data transfer devices can be configured to communicate using Bluetooth, Wi-Fi, USB or other available RF frequencies.

18. The apparatus of claim 17, wherein at least one of the bi-directional data transfer devices includes a headphone with a microphone, is configured to communicate using Bluetooth and has a Bluetooth circuit that converts the audio signal into short range wireless signals that can be received by the portable apparatus for storage.

19. The apparatus of claim 18, wherein the Bluetooth circuit further incorporates voice play-back and/or voice recorder functions.

20. The apparatus of claim 15, wherein the environmental sensors can be optical transmission devices such as IR sensors, pyrometers, laser pointers, infrared and optical wavelength cameras and coherent or directed energy rangefinders.

21. The apparatus of claim 1, further including a storage device.

22. The apparatus of claim 21, wherein the storage device is a removable storage device that includes removable media storage cards.

23. The apparatus of claim 21, wherein the storage device is configured to store audio and/or visual data.

24. The apparatus of claim 1, further including a central processor for controlling the portable apparatus, a storage device connected to the processor and storing data from the spectrum analyzer, a display device connected to the processor and displaying information from the processor, at least one environmental sensor whose output can be stored in the storage device, and a camera for creating an image of the machine under test and storing the image in the storage device, wherein the processor causes the display to show the image of the machine with at least one of the analyzer data and the sensor data imbedded therein.

* * * * *